(12) United States Patent
Suh et al.

(10) Patent No.: US 9,147,887 B2
(45) Date of Patent: Sep. 29, 2015

(54) FUEL CELL MODULE

(75) Inventors: Jun-Won Suh, Yongin-si (KR); Jan-Dee Kim, Yongin-si (KR); Seung-Tae Lee, Yongin-si (KR); Ho-Jin Kweon, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 270 days.

(21) Appl. No.: 12/833,772

(22) Filed: Jul. 9, 2010

(65) Prior Publication Data

US 2011/0177431 A1 Jul. 21, 2011

Related U.S. Application Data

(60) Provisional application No. 61/297,244, filed on Jan. 21, 2010.

(51) Int. Cl.
*H01M 4/02* (2006.01)
*H01M 8/02* (2006.01)
*H01M 4/90* (2006.01)

(52) U.S. Cl.
CPC .......... *H01M 8/0202* (2013.01); *H01M 4/9025* (2013.01); *H01M 8/025* (2013.01); *H01M 8/0247* (2013.01); *Y02E 60/50* (2013.01)

(58) Field of Classification Search
CPC ............ H01M 4/9025; H01M 8/0202; H01M 8/0247; H01M 8/025; Y02E 60/50
USPC .................................. 429/400–535, 170, 178
See application file for complete search history.

(56) References Cited

U.S. PATENT DOCUMENTS

| | | | |
|---|---|---|---|
| 4,719,157 A | | 1/1988 | Tsutsumi et al. |
| 5,336,569 A | * | 8/1994 | Misawa et al. ............... 429/456 |
| 6,383,677 B1 | * | 5/2002 | Allen ............................ 429/454 |
| 2004/0258972 A1 | | 12/2004 | Du et al. |
| 2005/0147857 A1 | * | 7/2005 | Crumm et al. ................. 429/31 |
| 2005/0249998 A1 | * | 11/2005 | Minas et al. ................... 429/37 |
| 2007/0003818 A1 | | 1/2007 | Bischoff et al. |
| 2007/0141447 A1 | | 6/2007 | Crumm et al. |

(Continued)

FOREIGN PATENT DOCUMENTS

| | | |
|---|---|---|
| CN | 86 1 03794 A | 12/1986 |
| JP | 09-293521 | 11/1997 |

(Continued)

OTHER PUBLICATIONS

KIPO Office action dated Apr. 30, 2012 in corresponding application KR 10-2010-0080289 (5 pps).

(Continued)

*Primary Examiner* — Milton I Cano
*Assistant Examiner* — Ling R Zeng
(74) *Attorney, Agent, or Firm* — Christie, Parker & Hale, LLP

(57) ABSTRACT

A tubular fuel cell module having improved current collecting efficiency. In one embodiment, the fuel cell module includes: a fuel cell unit; a first current collector extending along an outer side of the fuel cell unit; and a second current collector wound around the first current collector and around the outer side of the fuel cell unit. Here, the outer side of the fuel cell unit is a curved outer side, the first current collector has a curved inner side facing the curved outer side of the fuel cell unit, and the curved inner side of first current collector is shaped to match the curved outer side of the fuel cell unit.

16 Claims, 5 Drawing Sheets

(56) References Cited

U.S. PATENT DOCUMENTS

| | | | |
|---|---|---|---|
| 2007/0166589 A1 | 7/2007 | Nakanishi et al. | |
| 2008/0063916 A1* | 3/2008 | Hawkes et al. | 429/32 |
| 2009/0130511 A1 | 5/2009 | Eshraghi et al. | |

FOREIGN PATENT DOCUMENTS

| | | |
|---|---|---|
| JP | 11-025999 | 1/1999 |
| JP | 2000-021424 | 1/2000 |
| JP | 2002-222651 | 8/2002 |
| JP | 2002-231276 | 8/2002 |
| JP | 2002-260683 | 9/2002 |
| JP | 2003317725 A | 11/2003 |
| JP | 2005-129281 | 5/2005 |
| JP | 2005-203238 | 7/2005 |
| JP | 2005-353484 A | 12/2005 |
| JP | 2006-216421 | 8/2006 |
| JP | 2008-140563 | 6/2008 |
| KR | 10-0738308 B1 | 7/2007 |

OTHER PUBLICATIONS

Japanese Office action dated Nov. 27, 2012, for corresponding Japanese Patent application 2010-253166, (1 page).

SIPO Office action dated Mar. 15, 2013, with English translation, for corresponding Chinese Patent application 201110023719.3, (16 pages).

JPO Office action dated Mar. 19, 2013, for corresponding Japanese Patent application 2010-253166, (2 pages).

KIPO Notice of Allowance dated Jan. 22, 2013, for corresponding Korean Patent application 10-2010-0080289, (1 page).

European Search report dated May 27, 2011, for European Patent application 10166066.0, 4 pages.

JPO Office action dated Jul. 9, 2013, for corresponding Japanese Patent application 2010-253166, (3 pages).

SIPO Patent Gazette dated Aug. 20, 2014, for corresponding Chinese Patent application 201110023719.3, (2 pages).

* cited by examiner

FUEL CELL MODULE

CROSS-REFERENCE TO RELATED APPLICATION

This application claims priority to and the benefit of U.S. Provisional Application No. 61/297,244, filed on Jan. 21, 2010, in the United States Patent and Trademark Office, the entire content of which is incorporated herein by reference.

BACKGROUND

1. Field

The following description relates to a fuel cell module, in particular to a fuel cell module having a structure capable of increasing its current collecting efficiency.

2. Description of Related Art

Since fuel cells have various output ranges and uses, it is possible to select the fuel cells suitable for particular purposes. Among the fuel cells, a lot of attention has been directed to solid oxide fuel cells for distribution power generation, commerce, and home, because these fuel cells have advantages in that position control of an electrolyte is relatively easy, the electrolyte is hardly exhausted due to the fixed position of the electrolyte, and the life of the material is long due to high corrosion resistance. Further, solid oxide fuel cells are cells that operate at relatively high temperature of about 600~1000° C., and have several advantages in that they have the highest efficiency and cause little air pollution compared to a variety of fuel cells in the related art, do not need a fuel reformer, and allow for composite power generation.

However, such solid oxide fuel cells may not achieve sufficient voltage with only an individual fuel cell unit, such that, if necessary, the fuel cell units are stacked to be connected with each other, and these fuel cell units can be largely categorized as either a tube type or a flat plate type. It is envisioned that although the tube type has a decreased power density in the stack itself as compared with the flat plate type, the power density of the entire system is about the same. Further, the tube type makes it possible to easily seal the fuel cell units of the stack, has high resistance against thermal stress, and also has high mechanical strength of the stack, such that research about the tube type has been actively conducted as an advanced technology for manufacturing products having a large area.

Further, the tube type solid oxide fuel cell can be classified as either a cathode-supported fuel cell using the cathode as a support or an anode-supported fuel cell using the anodes as a support. The anode-supported fuel cell is an advanced type, such that the solid oxide fuel cells are now being developed for the anode-supported type.

A method of winding a wire made of silver (Ag) around a cathode to collect current has been used for current collectors in the related art

SUMMARY

An aspect of an embodiment of the present invention is directed toward a structure capable of reducing contact resistance between a current collector of a fuel cell module and the fuel cell unit on which the current collector is disposed.

Another aspect of an embodiment of the present invention is directed toward a specific structure that increases the surface area of a current collector and reduces contact resistance.

Another aspect of an embodiment of the present invention is to improve current collecting efficiency by utilizing a current collector having an improved structure capable of reducing its contact resistance with a fuel cell unit on which the current collector is disposed.

According to an embodiment of the present invention, there is provided a fuel cell module including: a fuel cell unit; a first current collector extending along an outer side of the fuel cell unit; and a second current collector wound around the first current collector and around the outer side of the fuel cell unit. Here, the outer side of the fuel cell unit is a curved outer side, the first current collector has a curved inner side facing the curved outer side of the fuel cell unit, and the curved inner side of first current collector is shaped to match the curved outer side of the fuel cell unit.

In one embodiment, a radius of curvature of the curved inner side of the first current collector is between 90 percent and 110 percent of that of the curved outer side of the fuel cell unit. Here, the radius of curvature of the curved inner side of the first current collector may not be greater than that of the curved outer side of the fuel cell unit.

In one embodiment, the curved inner side of first current collector is pressed into an outer circumference of the fuel cell unit. The curved inner side of the first current collector may be pressed into the outer circumference of the fuel cell unit to a depth between 10 μm and 100 μm. The fuel cell unit at the curved outer side of the fuel cell unit may be composed a softer material than that of the first current collector. The second current collector may be configured to press the curved inner side of the first current collector into the outer circumference of the fuel cell unit.

In one embodiment, the second current collector has a flat side configured to contact an outer side of the first current collector when the second current collector is wound around the first current collector. Here, other than at the flat side, the second current collector may have a substantially circular, rectangular or polygonal cross-section.

In one embodiment, the first current collector includes a plurality of conductive bars or wires longitudinally extending along a direction parallel to a central axis of the fuel cell unit.

In one embodiment, the first current collector has a cross-sectional area not less than that of the second current collector. The first current collector may include a plurality of first current collectors, and the cross-sectional area of each of the plurality of first current collectors may not be greater than a ratio of a total number of windings of the second current collector to a total number of the plurality of first current collectors multiple by the cross-sectional area of the second current collector. The cross-sectional area of each of the plurality of first current collectors may be equal to the ratio of the total number of windings of the second current collector to the total number of the plurality of first current collectors multiple by the cross-sectional area of the second current collector.

In one embodiment, the fuel cell module has a hollow, cylindrical shape.

In one embodiment, the first current collector partially surrounds the fuel cell unit. The second current collector may contact the fuel cell unit.

According to another embodiment of the present invention, there is provided a fuel cell module including: a fuel cell unit including an inner electrode layer, an outer electrode layer, and an electrolyte layer between the inner electrode layer and the outer electrode layer; a first current collector extending along an outer side of the fuel cell unit; and a second current collector wound around the first current collector and around the outer side of the fuel cell unit. Here, the first current collector has a curved inner side facing the outer side of the fuel cell unit, the outer side of the fuel cell unit is a curved outer side, and a radius of curvature of the curved inner side of the first current collector is between 90 percent and 110 percent of that of the curved outer side of the fuel cell unit.

In one embodiment, the radius of curvature of the curved inner side of the first current collector is greater than that of the curved outer side of the fuel cell unit. The curved inner side of first current collector may be pressed into an outer circumference of the fuel cell unit. The curved inner side of the first current collector may be pressed and embedded into the outer circumference of the fuel cell unit to a depth between 10 μm and 100 μm.

A fuel cell according to an embodiment of the present invention makes it possible to reduce contact resistance by utilizing surface contact (instead of line contact) between the current collector and the fuel cell unit.

Further, according to an embodiment of the present invention, it is possible to improve current collecting efficiency as compared with the related art, by providing the second current collector to be separate from the first current collector and making the second current collector to be in surface contact with the first current collector.

Further, according to an embodiment of the present invention, it is possible to improve efficiency of collecting current by providing the first current collector and the second current collector described above and to improve current collecting efficiency and reaction efficiency of fuel or air by improving the characteristics of the structure and area.

BRIEF DESCRIPTION OF THE DRAWINGS

The accompanying drawings, together with the specification illustrate exemplary embodiments of the present invention, and, together with the description, serve to explain the principles of the present invention.

DETAILED DESCRIPTION OF EXEMPLARY EMBODIMENTS

Figure 1A:
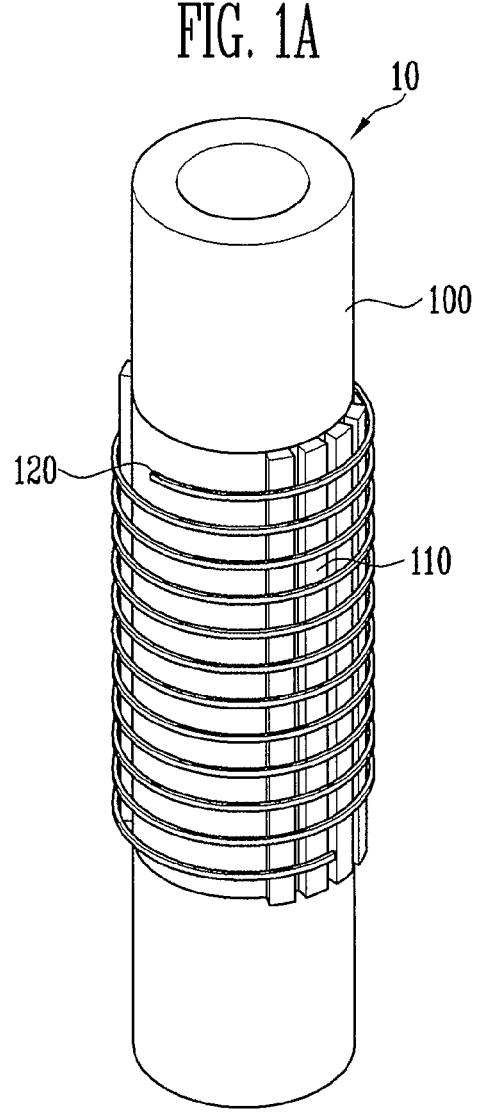
FIG. 1A is a perspective view showing a unit cell module according to an embodiment of the present invention.

Embodiments of the present invention will be described hereafter with reference to the accompanying drawings. If not specifically defined or stated, 'up', 'down', 'left', and 'right' are used herein to indicate directions are based on the drawings. Further, like reference numerals refer to like elements throughout the embodiments.

Typical fuel cells are composed of a fuel processor (a reformer and a reactor) that reforms and supplies fuel, and a fuel cell module. The fuel cell assembly includes a fuel cell stack converting chemical energy into electric energy and thermal energy, using an electrochemical reaction or method. That is, in one embodiment, the fuel cell assembly includes: a fuel cell stack; a pipe system through which fuel, oxide, cooling water, and effluent, etc. flow; a wire through which electricity generated by the stack is conducted; a component that controls or monitors the stack; and a component that manages abnormality of the stack.

An aspect of an embodiment of the present invention relates to the structure of a fuel cell module that forms part of the fuel cell assembly, and in particular to the structure of a current collector that transmits electrons generated by an oxidation reaction in the fuel cell unit of the fuel cell module, through an external conducting wire. Embodiments of the present invention are described in more detail hereafter.

Figure 1B:
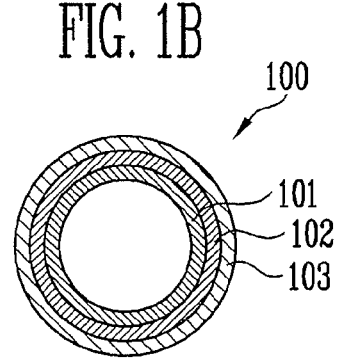
FIG. 1B is a cross-sectional view of the fuel cell unit that forms part of the fuel cell module shown in FIG. 1A.

A fuel cell module 10 is described with reference to FIGS. 1A and 1B. FIG. 1A is a perspective view showing a fuel cell unit 100, a first current collector (or a plurality of first current collectors) 110, and a second current collector 120 according to an embodiment of the present invention. FIG. 1B is a cross-sectional view of the fuel cell unit 100.

The fuel cell unit 100 is a component that is supplied with fuel reformed by a fuel processor and generates electricity by an oxidation reaction, and is formed in a hollow cylindrical shape in this embodiment. In the cylindrical fuel cell unit 100, electrode layers 101 and 103 (e.g., an anode and a cathode) are respectively formed at the inner circumference and the outer circumference of the cylindrical fuel cell unit 100, and an electrolyte layer 102 is formed between the two electrode layers 101 and 103. Depending on the purpose, there may be a case where the anode may be formed as the inner electrode layer, and the cathode may be formed at the outer electrode layer; or a case where the anode may be formed as the outer electrode layer, and the cathode may be formed as the inner electrode layer; but both cases are included in the present invention.

Figure 2:
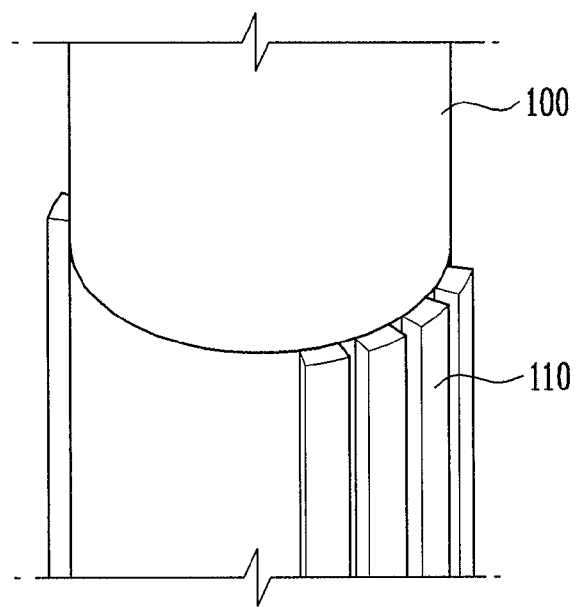
FIG. 2 is a perspective view showing the entire shape of a first current collector according to an embodiment of the present invention.
Figure 3:
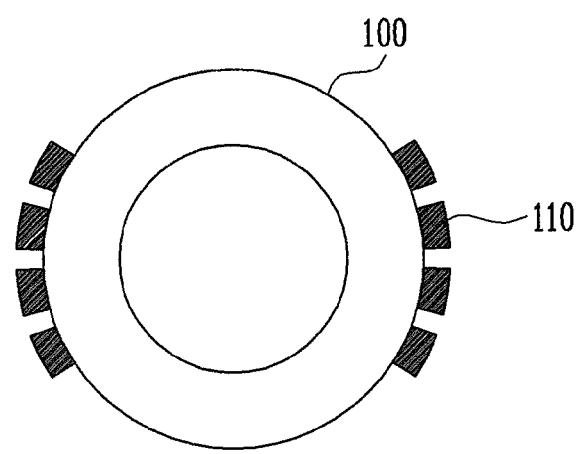
FIG. 3 is a plan view showing the shape of the first current collector according to an embodiment of the present invention.

The first current collector 110 is described with reference to FIGS. 2 and 3.

The first current collector 110 may be formed in a long bar shape or a conducting wire shape, as shown in FIG. 1A. The first current collector 100 is (or the plurality of first current collectors 100 are) aligned with the center axis of the fuel cell unit 100 and attached to the outer circumference (or periphery) of the fuel cell unit 100.

In this configuration, a conducting wire having a circular cross section was attached or wound in the related art, such that line contact was made between the outer circumference of the fuel cell unit and the current collector. Accordingly, contact resistance is relatively high for an amount of electrical charge collected by the current collector. Here, an embodiment of the present invention is characterized in that the outer circumference of the fuel cell unit 100 and the inner surface of the first current collector 110 are curved to be in surface contact with each other.

Figure 4A:
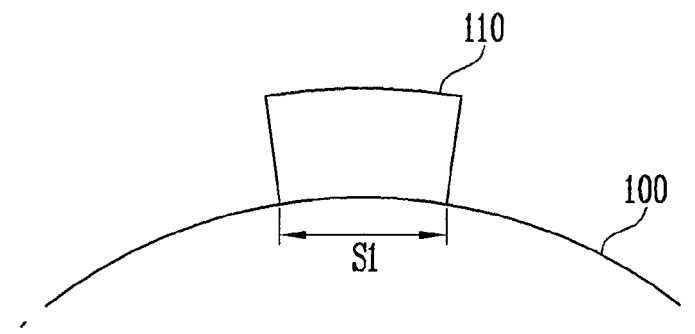
FIG. 4A is a schematic view showing a contact shape of the fuel cell unit and the first current collector according to an embodiment of the present invention.

The curved surface is described with reference to FIGS. 4A and 4B. As shown in FIG. 4A, and, according to one embodiment, the radius of curvature of the curved surface is exactly the same as the radius of curvature of the outer circumference of the fuel cell unit 100 to achieve complete surface contact S1. In this case, the contact area increases and contact resistance reduces. However, it may be technologically and economically difficult to precisely machine the first current collector 110 to have constant radius of curvature in manufacturing the first current collector 110 into a wire or a long conductive bar (or into wires or long conductive bars).

Therefore, in one embodiment of the present invention, a first current collector is manufactured such that the radius of curvature of the inner side of the first current collector 110 is exactly the same as the radius of curvature of the outer circumference of the fuel cell unit 100 or at least the tolerance of the radii is within 10 percent (%). When the tolerance is over 10%, it is difficult to achieve surface contact even by providing a tightly wound second current collector, which is described below in more detail.

Figure 4B:
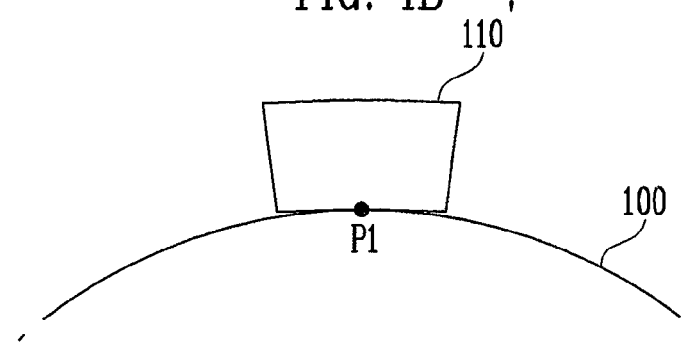
FIG. 4B is a schematic view showing a contact shape of the fuel cell unit and another first current collector according to another embodiment of the present invention.
Figure 4C:
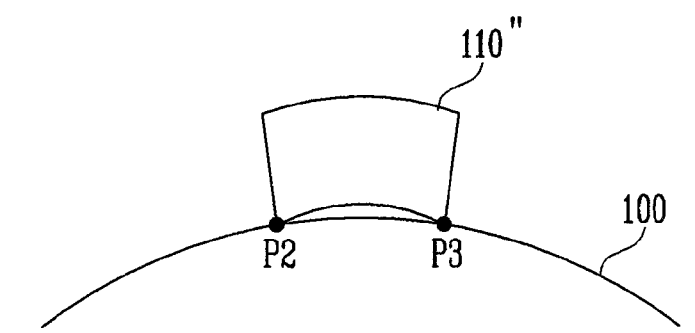
FIG. 4C is a schematic view showing a contact shape of the fuel cell unit and another first current collector according to another embodiment of the present invention.

FIG. 4B schematically shows when the radius of curvature of the inner side of a first current collector 110' is larger than that of the outer circumference of the fuel cell unit 100, and FIG. 4C schematically shows when a first current collector 100" is smaller than that. As shown in FIG. 4B, when the radius of curvature of the inner side of the first current collector 110' is larger than that of the outer circumference of the fuel cell unit 100, the first current collector 110' is in line contact (P1) with the fuel cell unit 100; whereas, as shown in FIG. 4C, when the radius of curvature of the inner side of the first current collector 110" is smaller than that of the outer circumference of the fuel cell unit 100, they are in line contact with each other at two points P2 and P3. Therefore, in one embodiment, the tolerance of the radii of curvature of the first current collector 110 and the outer circumference of the fuel cell unit 100 is configured to be less than 10% to achieve surface contact or line contact at two points even in consideration of the difference. In other words, the radius of curvature of a first current collector should not differ by more than 10% from the radius of curvature of a fuel cell unit on which the first current collector is disposed.

In another embodiment, the configuration of FIG. 4B may be utilized instead to that of FIG. 4C because a wire wound around the outer surface of the first current collector 110' will tend to pull the inner surface of the current collector 110' into a curve that more closely matches the contour of the periphery of the fuel cell unit 100.

Figure 5:
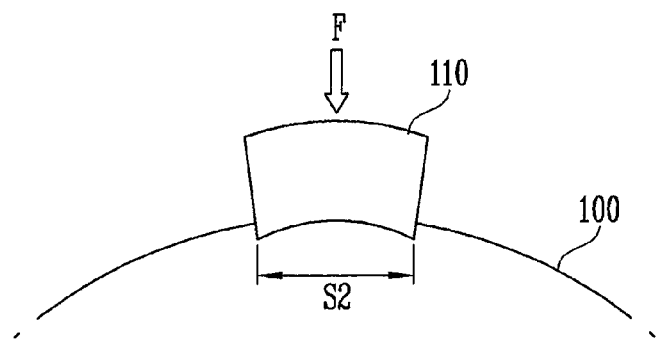
FIG. 5 is a schematic view showing when a first current collector is pressed and embedded into the outer circumference of the fuel cell unit.

As winding strength of the second current collector 120 (that is described below in more detail) is increased, an increase in force is applied to the first current collector 110 toward the center axis of the fuel cell unit 100. As the winding strength further increases, as shown in FIG. 5, the inner side of the first current collector 110 is pressed and embedded into the outer circumference of the first fuel cell unit 100. For the characteristics of the fuel cells that operate at high operational temperatures, precious metals, such as white gold, palladium, and silver, LaMnO3 with a perovskite structure studied in recent years and LaCoO$_3$-based substances with additives, and MICE (mixed ionic/electronic conductor), such as La$_{0.6}$Sr$_{0.4}$Co$_{0.2}$Fe$_{0.8}$O$_3$, Ba$_{0.5}$Sr$_{0.5}$Co$_{0.8}$Fe$_{0.2}$O$_{3-\delta}$, and Sm$_{0.5}$Sr$_{0.5}$CoO$_3$, used for increasing electroactivity at lower operational temperature, are mainly used for the material of the cathode. Since the cathode materials described above are usually softer than a nickel wire used for a current collector, when the outermost layer 103 of the fuel cell unit 100 is the cathode, the first current collector 110 is pressed and embedded into the outer circumference of the fuel cell unit 100 by external force. Further, although cermet including Ni, Ni-YSZ cermet, or Ni-GDC cermet is usually used for the material of the anode, their manufacturing process and combination strength are smaller than the first current collector, which is mainly formed of a nickel wire, such that the same phenomenon may occur.

When the first current collector 110 is embedded into the outer circumference of the fuel cell unit 100 as described above, as shown in FIG. 5, the surface contact increases in accordance with the embedded amount or in accordance with how deeply the first current collector 100 is embedded into the outer circumference of the fuel cell unit 100. It is appropriate that the first current collector 110 is pressed and embedded into the outer circumference of the fuel cell unit 100 at a depth of 10 μm to 100 μm. When the depth is just several micrometers, the level of surface contact is small, and when it is over 100 μm, tensile force exerted in the second current collector 120 excessively increases and it may break.

In one embodiment and as shown in FIG. 4B, the radius of curvature of the curved inner side of the first current collector 110' is greater than that of the curved outer side of the fuel cell unit 100. Here, pursuant to an embodiment of the present invention, this greater radius of curvature for the curved inner side of the first current collector 110' allows the curved inner side of the first current collector 110' to be pressed into an outer circumference of the fuel cell unit 100. Moreover, as envisioned in another embodiment of the present invention, the curved inner side of a first current collector may have a substantially "V" shape in which the tip or bottom point of the "V" is configured to face and be pressed into the outer circumference of the fuel cell unit such that this "V" shape first current collector can be better or more easily pressed into the outer circumference of the fuel cell unit.

Also, in one embodiment, a curved surface having curvature in the circumferential direction of the fuel cell unit is formed on the outer side of the first current collector 110. Here, it may be desired to make the curvature of the outer side of the first current collector 110 constant, thereby increasing the contact area with the second current collector 120, which is described in more detail below.

Further, since the smaller the radius of curvature of the outer side of the first current collector 110, the smaller the contact area with the second current collector 120 becomes, it may be desired to make the radius of curvature of the outer side of the first current collector 110 the same as or larger than that of the fuel cell unit 100.

Figure 6A:
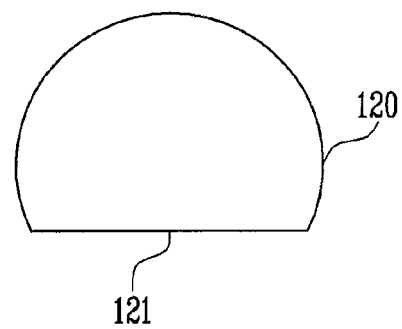
FIG. 6A is a cross-sectional view of a second current collector according to an embodiment of the present invention.
Figure 6B:
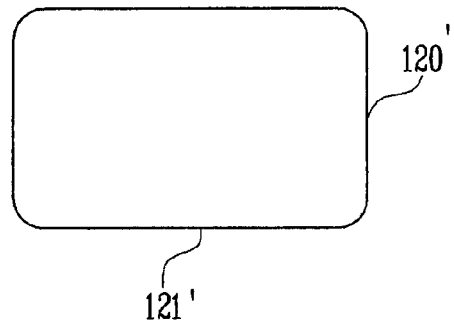
FIG. 6B is a cross-sectional view of another second current collector according to an embodiment of the present invention.
Figure 6C:
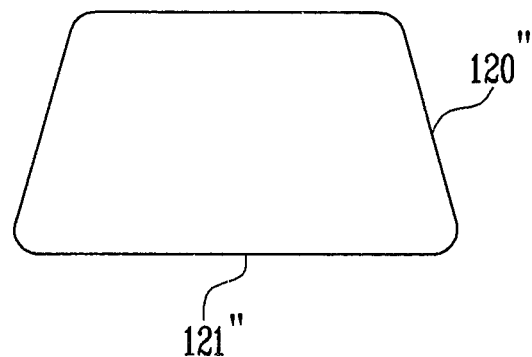
FIG. 6C is a cross-sectional view of another second current collector according to an embodiment of the present invention.

The second current collector 120 is described with reference to FIG. 6A. FIGS. 6A to 6C show the cross sections of second current collectors according to embodiments of the present invention.

Figure 7:
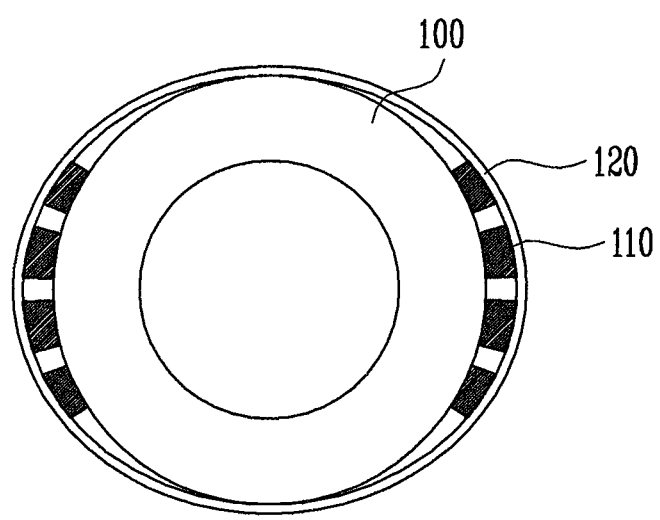
FIG. 7 is a cross-sectional view of a second current collector, a first current collector, and a fuel cell unit according to an embodiment of the present invention.

The second current collector 120 is formed in a wire shape, similar to existing current collectors, and wound on the outer circumference of the fuel cell unit 100 and the outer side of the first current collector 110. In this configuration, a flat surface (or side) 121 is longitudinally formed on the outer circumference of the second current collector, as shown in FIG. 6A, such that it is in surface contact with the outer side of the first current collector 110, when being wound around the outer sides of the fuel cell unit 100 and the first current collector 110, as shown in FIG. 7.

Contact resistance is reduced by the surface contact as compared with the related art, and accordingly, it is possible to achieve the same or larger effect in efficiency of collecting current, even if the number of windings is reduced. The shape of the contact surface 121 is important for the cross-sectional shape of the second current collector 120 and other shapes are not important. That is, as shown in FIG. 6A, the shape other than the contact surface 121 may be circular or other shapes, as shown in FIGS. 6B and 6C, and the result in one embodiment is largely unaffected even if the cross section is rectangular, non-uniform rectangular or even other polygonal shapes. That is, in FIG. 6A, the second current collector 120 has the flat surface (or side) 121 configured to contact an outer side of the first current collector 110 when the second current collector 120 is wound around the first current collector 110. Here, in FIG. 6A, other than the flat surface (or side) 121, the second current collector 120 has a substantially circular cross-section or has a circular shape side. In FIG. 6B, other than the flat surface (or side) 121', a second current collector 120' has a substantially rectangular cross-section or has a rectangular shape side. In FIG. 6C, other than the flat surface (or side) 121'', a second current collector 120'' has a substantially polygonal (or non-uniform rectangular) cross-section or has a polygonal shape side.

On the other hand, since the first current collector 110 and the second current collector 120 function as passages for electrons and the number of first current collectors 110 is smaller than that of the windings of the second current collector 120, the cross section of the first current collectors 110 should be larger than that of the second current collector 120. In this case, assuming the cross section and the number of first current collector are D1 and N1, respectively, and the cross section and the wound number of windings of the second current collector are D2 and N2, respectively, the cross section D1 of the first current collector can be determined within the following Formula 1

$$D2 \le D1 \le \frac{N2}{N1} \times D2 \quad \text{Formula 1}$$

That is, since the contact area between the fuel cell unit 100 and the first current collector 110 is proportional to the number of the first current collector 110, the contact area between the first current collector 110 and the second current collector 120 is proportional to the number of windings of the second current collector 120, Formula 1 should be satisfied for balance of the two contact areas, which function as passages for moving electrons.

Also, as shown in FIG. 7 and in one embodiment, the first current collector 110 only partially surrounds the fuel cell unit 100. Further, in one embodiment, the second current collector 120 contacts the fuel cell unit 100.

In view of the foregoing, a fuel cell module according to an embodiment of the present invention is provided with an improved current collector having structure capable of reducing a contact resistance of the current collector with its corresponding fuel cell unit. In an embodiment, the fuel cell module includes a tubular fuel cell unit, a first current collector extending along an outer side of the tubular fuel cell unit, and a second current collector wound around the first current collector and around the outer side of the tubular fuel cell unit. Here, the outer side of the tubular fuel cell unit is a curved outer side, the first current collector has a curved inner side facing the curved outer side of the tubular fuel cell unit, and the curved inner side of first current collector is shaped to match the curved outer side of the tubular fuel cell unit to increase the contact area between the first current collector and the outer side of the tubular fuel cell unit so as to reduce their contact resistance.

In addition, the curved inner side of first current collector may be pressed and embedded into an outer circumference of the tubular fuel cell unit to further increase their contact area and/or reduce their contact resistance. Here, the second current collector may be configured to press and embed the curved inner side of the first current collector into the outer circumference of the tubular fuel cell unit.

Embodiments of the present invention have been described above, but the spirit and scope of the present invention are not limited to the embodiments described above, and various fuel cell modules having improved efficiency of collection current can be implemented without departing from the spirit and scope of the present invention, which are specified in the following claims. That is, it should be understood that the present invention is not limited to the disclosed embodiments, but, on the contrary, is intended to cover various modifications and equivalent arrangements included within the spirit and scope of the appended claims, and equivalents thereof.

What is claimed is:

1. A fuel cell module comprising:
a fuel cell unit comprising an inner electrode layer, an electrolyte layer surrounding the inner electrode layer, and an outer electrode layer surrounding the electrolyte layer and having a convex curved surface;
a plurality of spatially separated first outer electrode layer current collectors for collecting current from the outer electrode layer and having concave curved sides facing and extending along the convex curved surface of the outer electrode layer, each of the concave curved sides of the first outer electrode layer current collectors having left and right edges extending along and pressing into the convex curved surface of the outer electrode layer to a depth of between 10 μm and 100 μm; and
a second outer electrode layer current collector for collecting current from the outer electrode layer and wound around the convex curved surface of the outer electrode layer with the first outer electrode layer current collectors therebetween.

2. The fuel cell module of claim 1, wherein a radius of curvature of the concave curved sides of the first outer electrode layer current collectors is between 90 percent and 110 percent of a radius of curvature of the convex curved surface of the outer electrode layer.

3. The fuel cell module of claim 2, wherein the radius of curvature of the concave curved sides of the first outer electrode layer current collectors is not greater than the radius of curvature of the convex curved surface of the outer electrode layer.

4. The fuel cell module of claim 1, wherein a material constituting the outer electrode layer where the convex curved surface of the outer electrode layer contacts the concave curved sides of the first outer electrode layer current collectors is softer than a material constituting the first outer electrode layer current collectors.

5. The fuel cell module of claim 1, wherein the second outer electrode layer current collector presses the concave curved sides of the first outer electrode layer current collectors into the convex curved surface of the outer electrode layer.

6. The fuel cell module of claim 1, wherein the second outer electrode layer current collector has a flat side contacting the first outer electrode layer current collectors.

7. The fuel cell module of claim 6, wherein, other than at the flat side, the second outer electrode layer current collector has a substantially circular, rectangular or polygonal cross-section.

8. The fuel cell module of claim 1, wherein the first outer electrode layer current collectors comprise a plurality of conductive bars or wires longitudinally extending along a direction parallel to a central axis of the outer electrode layer.

9. The fuel cell module of claim 1, wherein a cross-sectional area of the first outer electrode layer current collectors is not less than a cross-sectional area of the second outer electrode layer current collector.

10. The fuel cell module of claim 9, wherein:
the first outer electrode layer current collectors comprise a number of the first outer electrode layer current collectors,
the second outer electrode layer current collector winds around the convex curved surface of the outer electrode layer for a number of windings, and
a contact area of the first outer electrode layer current collectors with the convex curved surface of the outer electrode layer is not greater than a contact area of the second outer electrode layer current collector with the first outer electrode layer current collectors.

11. The fuel cell module of claim 10, wherein the contact area of the first outer electrode layer current collectors with the convex curved surface of the outer electrode layer is equal to the contact area of the second outer electrode layer current collector with the first outer electrode layer current collectors.

12. The fuel cell module of claim 1, wherein the fuel cell unit has a hollow cylindrical shape.

13. The fuel cell module of claim 1, wherein the first outer electrode layer current collectors partially surround the outer electrode layer.

14. The fuel cell module of claim 13, wherein the second outer electrode layer current collector contacts the outer electrode layer.

15. A fuel cell module comprising:
a fuel cell unit comprising an inner electrode layer, an outer electrode layer having a convex curved surface, and an electrolyte layer between the inner electrode layer and the outer electrode layer;
a plurality of spatially separated first outer electrode layer current collectors for collecting current from the outer electrode layer and having concave curved sides facing and extending along the convex curved surface of the outer electrode layer, each of the concave curved sides of the first outer electrode layer current collectors having left and right edges extending along, and pressing and embedding into the convex curved surface of the outer electrode layer to a depth of between 10 µm and 100 µm; and
a second outer electrode layer current collector for collecting current from the outer electrode layer and wound around the convex curved surface of the outer electrode layer with the first outer electrode layer current collectors therebetween,
wherein a radius of curvature of the concave curved sides of the first outer electrode layer current collectors is between 90 percent and 110 percent of a radius of curvature of the convex curved surface of the outer electrode layer.

16. The fuel cell module of claim 15, wherein the radius of curvature of the concave curved sides of the first outer electrode layer current collectors is not greater than the radius of curvature of the convex curved surface of the outer electrode layer.

* * * * *